United States Patent
Austin-Lane et al.

(10) Patent No.: US 7,496,631 B2
(45) Date of Patent: Feb. 24, 2009

(54) DELIVERY OF AN ELECTRONIC COMMUNICATION USING A LIFESPAN

(75) Inventors: Christopher Emery Austin-Lane, Takoma Park, MD (US); Shauna Harris, Belmont, CA (US); Albert Lekuo Lee, Sunnyvale, CA (US); Jason White, Dulles, VA (US); Lea-Ying Amy Lin, Palo Alto, CA (US); Bret Kümmel Thaeler, San Jose, CA (US)

(73) Assignee: AOL LLC, Dulles, VA (US)

( * ) Notice: Subject to any disclaimer, the term of this patent is extended or adjusted under 35 U.S.C. 154(b) by 422 days.

(21) Appl. No.: 10/460,639

(22) Filed: Jun. 13, 2003

(65) Prior Publication Data

US 2004/0059790 A1    Mar. 25, 2004

Related U.S. Application Data

(60) Provisional application No. 60/406,078, filed on Aug. 27, 2002.

(51) Int. Cl.
*G06F 15/16* (2006.01)

(52) U.S. Cl. .......................... 709/206; 709/207; 709/224

(58) Field of Classification Search ................. 709/206, 709/207, 201–202, 204–205, 217–219, 224
See application file for complete search history.

(56) References Cited

U.S. PATENT DOCUMENTS

| | | | |
|---|---|---|---|
| 5,646,982 A * | 7/1997 | Hogan et al. | 379/88.22 |
| 5,771,280 A | 6/1998 | Johnson | |
| 5,933,477 A * | 8/1999 | Wu | 379/88.26 |
| 6,067,561 A | 5/2000 | Dillon | |
| 6,115,455 A * | 9/2000 | Picard | 379/88.22 |
| 6,175,859 B1 | 1/2001 | Mohler | |
| 6,208,996 B1 | 3/2001 | Ben-Shachar et al. | |
| 6,430,604 B1 | 8/2002 | Ogle et al. | |
| 6,460,073 B1 * | 10/2002 | Asakura | 709/206 |
| 6,567,807 B1 * | 5/2003 | Robles et al. | 707/10 |
| 6,584,494 B1 | 6/2003 | Manabe et al. | |
| 6,618,747 B1 * | 9/2003 | Flynn et al. | 709/206 |
| 6,636,888 B1 | 10/2003 | Bookspan et al. | |
| 6,687,745 B1 | 2/2004 | Franco et al. | |
| 6,721,784 B1 * | 4/2004 | Leonard et al. | 709/206 |
| 6,732,103 B1 * | 5/2004 | Strick et al. | 709/206 |
| 6,732,185 B1 * | 5/2004 | Reistad | 709/206 |
| 6,782,414 B1 * | 8/2004 | Xue et al. | 709/206 |

(Continued)

OTHER PUBLICATIONS

International Search Report, PCT/US03/26762, dated Apr. 16, 2004.

(Continued)

*Primary Examiner*—Philip B. Tran
(74) *Attorney, Agent, or Firm*—Fish & Richardson P.C.

(57) ABSTRACT

Providing an electronic notification to an intended recipient includes communicating an electronic notification directed to an intended recipient, determining a lifespan related to a duration of relevance of the electronic notification, and providing the electronic notification to the intended recipient when the lifespan has not expired. The duration of relevance describes a time period during which information of the electronic notification reasonably may be expected usefully to inform an action or interest of the intended recipient. After the lifespan expires, provision of the electronic notification to the intended recipient may be prevented.

22 Claims, 10 Drawing Sheets

U.S. PATENT DOCUMENTS

| | | | |
|---|---|---|---|
| 6,854,007 B1* | 2/2005 | Hammond | 709/206 |
| 6,934,367 B1* | 8/2005 | LaPierre et al. | 379/88.12 |
| 6,999,566 B1* | 2/2006 | Eason et al. | 709/206 |
| 7,133,506 B1* | 11/2006 | Smith | 379/88.25 |
| 2001/0016823 A1 | 8/2001 | Richards et al. | |
| 2002/0021307 A1* | 2/2002 | Glenn et al. | 709/205 |
| 2002/0032742 A1 | 3/2002 | Anderson | |
| 2002/0078077 A1* | 6/2002 | Baumann et al. | 707/206 |
| 2002/0120687 A1 | 8/2002 | Diacakis et al. | |
| 2002/0123328 A1 | 9/2002 | Snip et al. | |
| 2002/0151294 A1* | 10/2002 | Kirby et al. | 455/406 |
| 2002/0160757 A1* | 10/2002 | Shavit et al. | 455/414 |
| 2002/0160805 A1 | 10/2002 | Laitinen et al. | |
| 2002/0165729 A1* | 11/2002 | Kuebert et al. | 705/1 |
| 2003/0018704 A1* | 1/2003 | Polychronidis et al. | 709/202 |
| 2003/0023681 A1 | 1/2003 | Brown et al. | |
| 2003/0052915 A1 | 3/2003 | Brown et al. | |
| 2003/0055897 A1 | 3/2003 | Brown et al. | |
| 2003/0081001 A1* | 5/2003 | Munro | 345/752 |
| 2003/0154254 A1* | 8/2003 | Awasthi | 709/206 |
| 2003/0158902 A1* | 8/2003 | Volach | 709/206 |
| 2003/0208547 A1 | 11/2003 | Branimir | |
| 2003/0227894 A1 | 12/2003 | Wang et al. | |
| 2003/0229668 A1* | 12/2003 | Malik | 709/206 |
| 2003/0233413 A1* | 12/2003 | Becker | 709/206 |
| 2004/0010808 A1* | 1/2004 | deCarmo | 709/219 |
| 2004/0019645 A1 | 1/2004 | Goodman et al. | |
| 2004/0078440 A1 | 4/2004 | Potter et al. | |
| 2004/0203766 A1* | 10/2004 | Jenniges et al. | 455/403 |

OTHER PUBLICATIONS

Office Action in U.S. Appl. No. 10/320,712, dated Jun. 16, 2005.

Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
CommWorks 8250 Personal Communications Management System; Dec. 11, 2002; commworks.com; pp. 1-2.
CommWorks IP Messaging; Dec. 11, 2002; commworks.com; pp. 1-2.
WebleySystems; CommuniKate Unified Communications Features List; Dec. 11, 2002; webley.com; pp. 1-3.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Microsoft PressPass; Nov. 7, 2002; microsoft.com; pp. 1-9.
Adeptra, Features; Nov. 27, 2002; adeptra.com; pp. 1-2.
Solutions Smartdelivery; Nov. 6, 2002; centerpost.com; pp. 1-2.
.Net Alerts Overview; Nov. 7, 2002; microsoft.com; pp. 1-3.
Adeptra Services Overview; Nov. 7, 2002; adeptra.com; pp. 1-7.
Ipipi Frequently Asked Questions; Nov. 6, 2002; ipipi.com; pp. 1-2.
Ozmosys Enterprise; Nov. 7, 2002; ozmosys.com; pp. 1-3.
Teraitech; Nov. 7, 2002; teraitech.com; 1 page.
Global Solutions Directory; Nov. 7, 2002; software.ibm.com; pp. 1-5.
Convergys Interactive Alerts Reduce Customer Care Costs and Improve Customer Satisfaction; convergys.com; pp. 1-2.
Upside, About Our Product; upsideweb.com; pp. 1-5.

* cited by examiner

DELIVERY OF AN ELECTRONIC COMMUNICATION USING A LIFESPAN

CROSS REFERENCE TO RELATED APPLICATION

This application claims the benefit of U.S. Provisional Application No. 60/406,078, filed Aug. 27, 2002.

TECHNICAL FIELD

This disclosure generally relates to systems and methods of delivering information to a delivery mechanism.

BACKGROUND

Online service providers make available to their users a wide range of information and services, much of which may be time sensitive. Users have virtually on-demand access to information and/or services regarding news, weather, stocks, banking, sports scores, and entertainment offerings. For example, users of online service providers such as America Online® or CompuServe® may view and retrieve information on a wide variety of topics from servers located throughout the world. Users also have the ability to access calendaring or scheduling services that may be used to track time sensitive items, such as, for example, a meeting, an assigned task, a birthday, and/or an anniversary. When time sensitive information is provided in an untimely fashion, that information may fail to provide a benefit, and, rather, may inconvenience and/or irritate the recipient of the information.

SUMMARY

In one general aspect, providing an electronic notification to an intended recipient includes processing an electronic notification directed to an intended recipient, determining a lifespan related to a duration of relevance of the electronic notification, and providing the electronic notification to the intended recipient when the lifespan has not expired. The duration of relevance describes a time period during which information of the electronic notification reasonably may be expected usefully to inform an action or interest of the intended recipient. After the lifespan has expired, provision of the electronic notification to the intended recipient may be prevented. The electronic notification may be provided to the intended recipient using various delivery mechanisms, such as, for example, a wired or wireless device, an email account, or a voicemail account (e.g., multiple instances of the electronic notification may be provided).

Implementations may include one or more of the following features. For example, providing an electronic notification to an intended recipient also may include monitoring for an online presence of the intended recipient during the lifespan and indicating the online presence when the online presence is detected. Based on the detected online presence of the intended recipient, the electronic notification may be provided to the intended recipient in an online format during the lifespan of the electronic notification. The electronic notification also may be provided to the intended recipient in an offline format during the lifespan of the electronic notification, such as, for example, when an online presence of the intended recipient is not detected. The electronic notification may be provided to the intended recipient based also on a delivery precedence associated with the electronic notification. In any event, after the electronic notification is provided to the intended recipient, the electronic notification may be deleted or disabled when the intended recipient does not access the electronic notification during the lifespan.

The electronic notification may be based on a critical time, such as, for example, a start or end time of an event, a goal date or drop-dead date of an assigned task, or a time at which an unscheduled event began. The lifespan may include a notice period indicative of a time period preceding the critical time and/or a response period indicative of a time period following the critical time. The lifespan may be defined in terms of a relative or an absolute time.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

An electronic notification may be delivered to an intended recipient based on a lifespan associated with the electronic notification. The lifespan may represent a period during which the electronic notification is expected to be relevant to the intended recipient. Delivery of the notification based on the lifespan enhances the likelihood that the electronic notification will be delivered to the intended recipient at a time at which the notification will be useful. The lifespan may be used to avoid untimely delivery of the notification that may cause the intended recipient to view the notification as not useful and/or as an annoyance.

Figure 1:
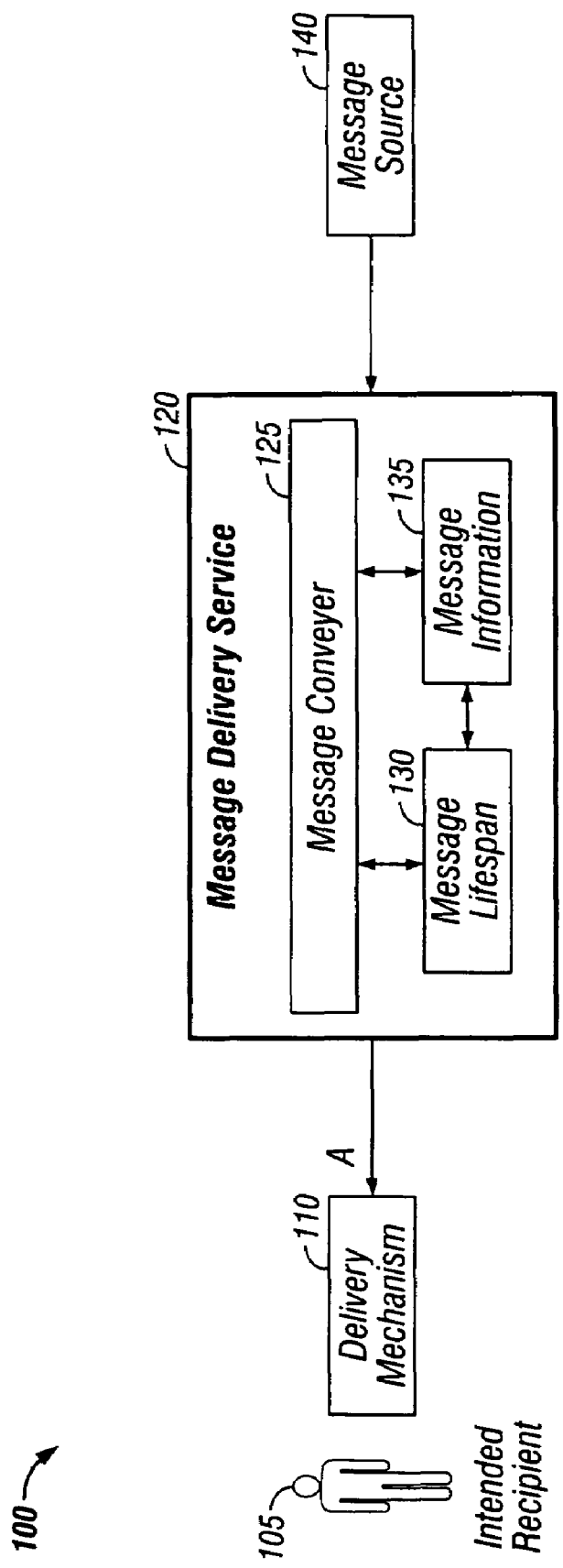
FIG. 1 is a schematic diagram of an electronic communication system.

FIG. 1 shows a generalized system 100 used to deliver an electronic message to an intended recipient 105 at a delivery mechanism 110 based on a lifespan of the message. The delivery mechanism 110 generally may include any device, system, and/or piece of code that relies on another service to perform an operation. The delivery mechanism 110 may include, for example, a fixed or mobile communication device, whether wired or wireless, and/or a software application, such as, for example, a messaging application or a browser. The delivery mechanism 110 also may include any protocols (i.e., standards, formats, conventions, rules, and structures) or delivery channels appropriate to communicating the electronic message. The protocols or delivery channels may include, for example, one or more other systems, such as for example, one or more wired networks and/or one or more wireless networks.

A message delivery service 120 communicates with a message source 140 and obtains a message directed to the intended recipient 105. The message delivery service 120 includes a message conveyer 125, a message lifespan module 130, and a message information module 135.

The message conveyer 125 may be configured to access, receive, or assign a message lifespan using the message lifespan module 130, which may access message information using the message information module 135, and to deliver the electronic message to the intended recipient 105 based on the message lifespan. That is, in general, the message delivery service 120 uses the message conveyer 125 to deliver the electronic message to the intended recipient 105 only while the electronic message is expected to be relevant based on the message lifespan as determined by the message lifespan module 130.

The message conveyer 125 delivers the electronic message based on the message lifespan and/or the message information. The message lifespan may indicate an expected or actual period of relevance to the intended recipient 105. The message lifespan may be based on the message information, and/or other information indicative of relevance. The message information may include, for example, message content, preferences of the intended recipient 105, system definitions, a delivery rule, and/or any other information associated with the electronic message.

The message source 140 typically may include any source of an electronic message or information. The message source 140 may employ one or more protocols to transfer information internally or to deliver information to the message delivery service 120.

Both the message delivery service 120 and the message source 140 may further include various mechanisms for delivering voice and/or non-voice data. The various mechanisms may include, for example, any applications, protocols, devices, or networks used to facilitate communication of electronic data. Both the message delivery service 120 and the message source 140 also may include or be included in a general-purpose or a special-purpose computer, at least one local area network, and/or at least one wide area network. The response to and execution of instructions received by the message delivery service 120, the message source 140, or any of their components (collectively the system services), may be controlled by, for example, a program, a piece of code, an instruction, a device, a computer system, or a combination thereof, for independently or collectively instructing the system services to interact and operate as described herein.

Figure 2:
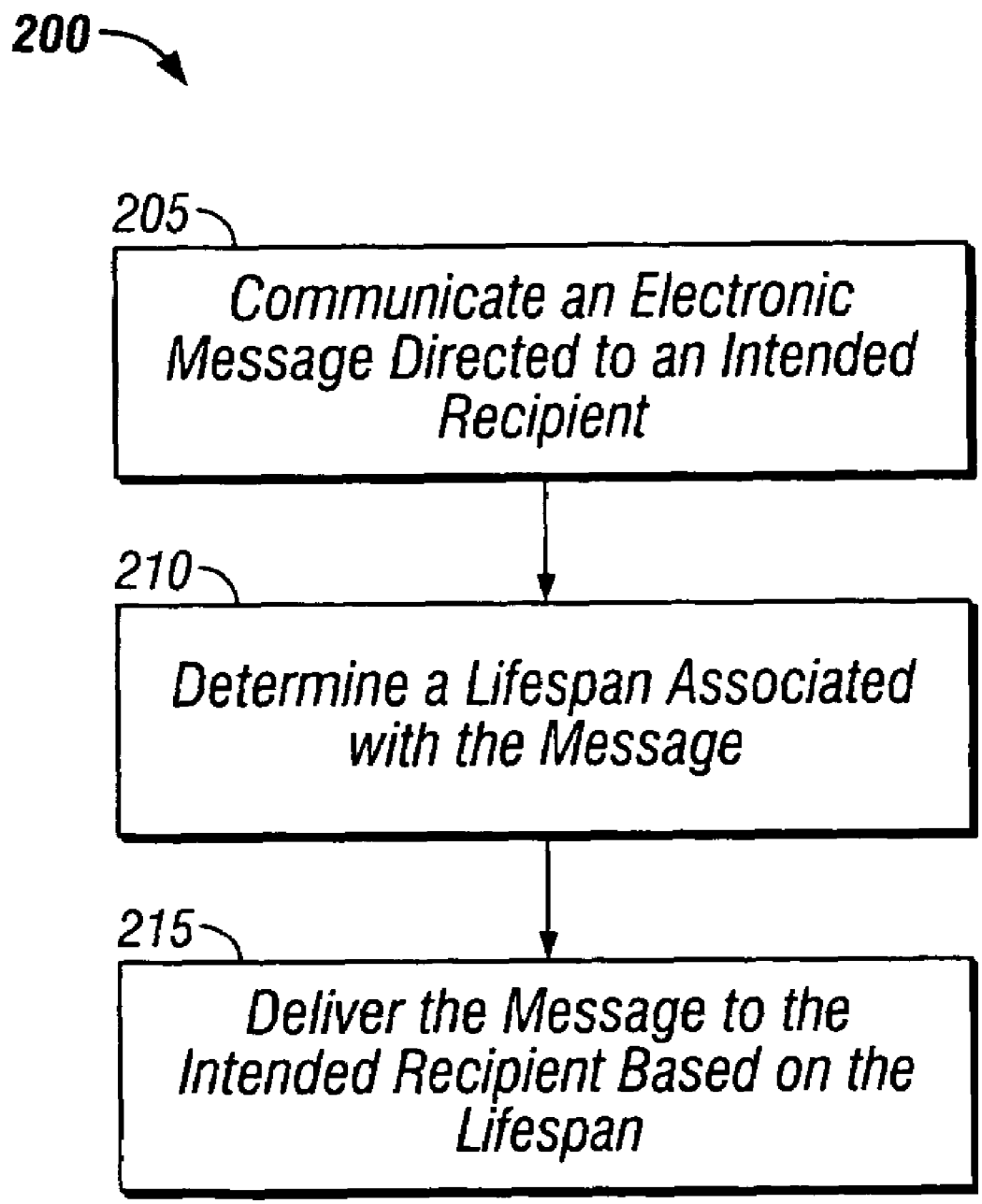
FIG. 2 is a flow diagram of a process implementable by the electronic communication system of FIG. 1.

FIG. 2 illustrates a flow diagram of a process 200 implementable by, for example, the system 100 of FIG. 1 to deliver a message to a user based on the message lifespan. The message source 140 communicates to the message delivery service 120 an electronic message directed to the intended recipient 105 (step 205). The message source 140 may communicate the message to the message delivery service 120 in response to activity of the message delivery service 120, of another system or service, or of the message source 140. The message delivery service 120 may use the message lifespan module 130 to determine a lifespan associated with the electronic message before delivering the message to the intended recipient 105 (step 210). The message delivery service 120 employs the message conveyer 125 to deliver the electronic message to the intended recipient 105 using the message lifespan (step 215).

Figure 3:
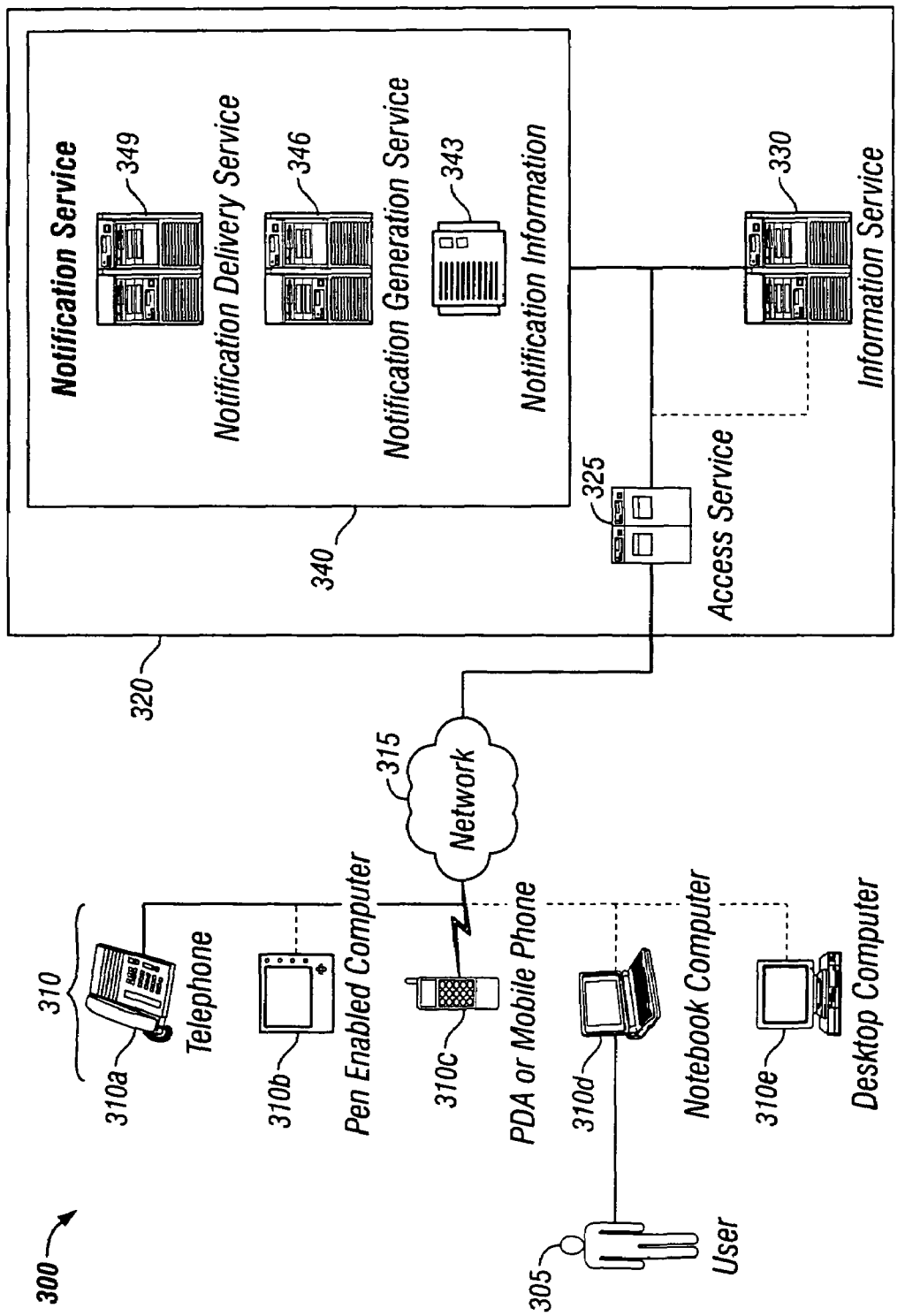
FIG. 3 is a schematic diagram of an electronic notification delivery system.

Referring to FIG. 3, a generalized notification system 300 notifies a user 305 of information or an event by providing an electronic notification (notification) to one or more delivery mechanisms 310 associated with the user 305 during a lifespan of the notification. The lifespan is related to a durational relevance of the electronic notification (e.g., a time period during which the information of the electronic notification is relevant to the user). The notification system 300 provides the notification to the delivery mechanisms 310 using a network 315 and an online service 320. Exemplary components of the notification system 300 are described in greater detail below.

The delivery mechanisms 310 generally are analogous to the delivery mechanism 110 of FIG. 1. Each delivery mechanism 310 may include any device, system, and/or piece of code that relies on another service to perform an operation. For example, a delivery mechanism 310 may include a device such as a telephone 310a, a pen-enabled computer 310b, a personal digital assistant (PDA) or mobile telephone 310c, a notebook computer 310d, and/or a desktop computer 310e. The delivery mechanisms 310 also may include, for example, a Web browser, an email client, a synchronization client (e.g., a calendar synchronization client, or a task list synchronization client), an instant messaging (IM) client, a short message service (SMS) client, a business productivity application (e.g., a word processing program, or a spreadsheet program), and/or an operating system or operating system kernel residing on a device. The delivery mechanisms 310 may be arranged to operate within or in concert with one or more other systems, such as, for example, one or more LANs (local area networks) and/or one or more WANs (wide area networks).

Each of the delivery mechanisms 310 may be accessible to the online service 320, and the user 305 may access the online service 320 using one or more of the delivery mechanisms 310. For example, the user 305 may use the notebook computer 310d to access the online service 320.

A delivery mechanism 310 may receive a notification and format the notification using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), a document object model (DOM), or the dynamic hypertext markup language (DHTML). The formatted notification may permit the user 305 to respond to the notification.

The online service 320 generally may include, for example, any device, system, and/or piece of code configured to perform an operation requested by one or more of the delivery mechanisms 310 (e.g., the PDA or mobile telephone 310c, a Web browser, the workstation 310c, or another service). The online service 320 includes an access service 325. that controls access to the online service 320 using, for example, authorization and/or authentication methods. The access service 325 may transform messages received from the network 310 into a communication protocol of the online service 320 (e.g., a synchronous transfer mode (ATM) or fiber distributed data interface (FDDI)).

The online service 320 also includes an information service 330. The information service 330 typically includes different services and sources of information, such as, for example, third party information or services, email, a discussion group, a chat room, a news service, a broker service, a banking service, a shopping service, a weather service, the World Wide Web, or Internet access. The information service 330 may employ one or more protocols (i.e., standards, formats, conventions, rules, and structures) to transfer information internally or to deliver information to a user. Protocols employed by the information service 330 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP) and/or the simple mail transfer protocol (SMTP).

The online service 320 also includes a notification service 340 that provides a notification to the user 305 based on information of the information service 330. The notification service 340 employs notification information 343 that may be determined based on information of the notification service 340, information of the information service 330, and/or information of other online services.

The notification information 343 may include user preferences and system definitions. For example, the notification information 343 may include a delivery preference of the user 305 determined based on information provided by the user 305 to the notification service 340. The information provided by the user 305 to the notification service 340 also may be used to define a lifespan of a notification, and/or the lifespan may be defined expressly or implied by information of the information service 330. For example, a notification may have an associated critical time (e.g., a time at which an event is scheduled to begin, or a time at which a notification is generated based on occurrence of an unscheduled event). A time period preceding the critical time may be referred to as a notice period while a time period following the critical time may be referred to as a response time. A user may ask the notification service to be notified of an event during a notice period prior to a critical time at which the event is scheduled to begin. The user also may indicate that the user does not care to be notified of the event beyond a response period following the scheduled start of the event. In sum, the user may indicate a time period during which the user perceives the notification to be useful or relevant. That time period may be used to define a lifespan for the notification, and may be described, for example, in terms of an absolute time or in terms of a relative time.

The system definitions may be generated by the system or by an administrator of the system. The system definitions may include, for example, definitions of classes of notifications, and/or definitions of each available notification. The system definitions also may define a lifespan of a notification (e.g., by forecasting a time period during which the notification is expected to be useful to a user). The definition of each notification includes one or more conditions to be satisfied before the notification may be delivered. When those conditions are satisfied, the notification is considered to be triggered, and the event or information that satisfied the conditions is known as the triggering event (or triggering information). For simplicity, the conditions satisfied by the triggering event may themselves be referred to as the triggering event. The triggering event (e.g., a triggering event of the information service 330) may include information defining an associated lifespan and/or a list of intended notification recipients.

Numerous examples of triggering events exist, but, for brevity, only a few of those examples are described here. Triggering events may be based, for example, on a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; a particular date, holiday and/or other special occasion; an online status of another user; a change to a predetermined web page; or entertainment programming and/or ticket information.

The notification information also may include a record of users registered to receive notifications, and a record of the notifications (active notifications) that the users have registered to receive. Upon registration to receive a notification, a user may inform the notification service 340 of notification preferences regarding that notification. The notification service 340 may include those notification preferences in the notification information.

For example, the user 305 may access the notification service 340 to register for a stock alert and a birthday reminder. The notification service 340 may record that the user 305 has registered for the stock alert and the birthday reminder. At registration, the user 305 may provide the notification service 340 with notification preferences. In general, the notification preferences may include triggering information, a timing of the notification, a lifespan of the notification or information that may be used to determine a lifespan, a notification delivery preference, and/or a presentation method of the notification. A variety of delivery and/or presentation methods may be available for selection by the user 305. For example, the user 305 may select to receive the notification as an instant message, an icon, a pop-up window, a video, a flashing indicator, and/or an audio or tactile alarm. The notification may be delivered to the user 305 while the user 305 is online, for example, and/or may be delivered to a wireless device (e.g., a mobile phone, a PDA, or a pager), a standard telephone, voicemail, and/or email if the user 305 so desires. In this manner, the user may arrange to be notified in a manner that the user anticipates will most likely provide the notification to the user without significant delay.

Referring back to the notifications selected by the user 305, the user 305 may request delivery of a stock alert when a specified stock exceeds a 52-week high. The user 305 may indicate, however, that the user 305 does not wish to receive the stock alert more than three days after the stock exceeds the 52-week high. In this manner the user 305 provides information that may be used to define a lifespan for the stock alert. The stock alert will not be delivered after passage of the lifespan. Moreover, if delivered, the stock alert may be deleted if the user 305 does not access the stock alert (e.g., by viewing an associated pop-up window, and/or by accessing an associated email or voicemail message) prior to passage of the lifespan.

As another example, the user 305 may request delivery of a birthday reminder one week prior to the specified birthday and delivery of a subsequent reminder again the day before, and to be reminded through a non-intrusive email. The subsequent reminder may replace the initial reminder if the initial reminder has not been accessed already. Moreover, the user 305 may consider two weeks an upper bound for an acceptable belated birthday wish. As a result, the user 305 may indicate a desire to not receive or see the birthday reminders later than two weeks after the birthday. Based on this information, the email notification of the birthday may be removed automatically two weeks following the birthday if the user 305 has not accessed the notification by that time. For each birthday reminder, the associated lifespan may be defined as the time between generation of the birthday reminder and the birthday plus the two weeks following the birthday after which the user 305 no longer wishes to receive or see the reminder.

The notification service 340 includes a notification generation service 346 that generates notifications based on the information maintained by the information service 330, and a notification delivery service 349 that delivers the notifications to the user 305 using one or more of the delivery mechanisms 310. The notification service 340 also may include a print service, a file access service, an IM service, an operating system, an operating system kernel, an authentication service, an authorization service, and/or any combination of these or other services.

In general, the notification generation service 346 generates notifications based on the notification information maintained by the notification service 340. The notification generation service 346 communicates with the information service 330 (e.g., by polling the information service 330 or by receiving updates from the information service 330 periodically or upon a triggering event) to identify when a notification trigger is satisfied, for example, by the occurrence of a particular event or by the presence of predetermined information. Alternatively, the information service 330 itself may note the triggering event and notify the notification generation service 346. In either event, the notification generation service 346 generates and communicates a corresponding notification to the notification delivery service 349 for delivery.

Typically, the notification generation service 346 includes a software program or piece of code to control reception and/or retrieval of information from the information service 330. The notification generation service 346 may receive the information from the information service 330, and then may determine whether the information corresponds to a triggering event of a notification of interest to the user 305.

Alternatively, or in addition, a notification may be generated by the information service 330 (e.g., by a third party service that provides a certain category of notifications, such as stocks, news, or weather) including definition of an associated lifespan. The notification service 340 may include an application programming interface (API) structured for configuring and/or communicating electronic notifications with the notification service 340. Content for the notification may be provided by the notification generation service 346, the information service 330, or by any other third party, including the user 305. In one implementation, the notification service 340 queries user 305 as to whether the user 305 would like to receive various categories of third party notifications. For example, the notification service 340 may communicate with third party suppliers of computer merchandise and may query the user 305 as to whether the user 305 would like to receive notifications from any or all third parties that supply computer merchandise. In another implementation, the user 305 may register for a notification at a web site of a third party. Once the user 305 has registered to receive the notification, the third party may directly or indirectly generate the notification.

The notification delivery service 349 may be configured to receive the notification from the notification generation service 346 and to deliver the notification to the user 305. The notification delivery service 349, alone or in conjunction with other services, may perform sorting, prioritizing, or other types of organizational processing on the notification so that the notification is delivered appropriately to the user 305.

More particularly, the notification delivery service 349 may monitor for an online presence of the user 305. The notification delivery service 349 may deliver the notification to the user offline (e.g., to an email account or to a voicemail account). In the alternative, or in addition, when an online presence of the user 305 is indicated, the notification delivery service 349 may deliver the notification to the user 305 online (e.g., using a pop-up window, an instant message or a Web browser). In any event, the notification delivery service 349 delivers the notification to the user 305 based on the lifespan and other notification information 343.

In addition, when multiple instances of a notification are provided to a user, the multiple instances may be associated. Based on the association between the multiple notification instances, access by the user 305 of one notification instance may be used to disable or delete some or all of the other notification instances. In this manner, the notification delivery service 349 may deliver the notification to the user 305 with a minimum of delay while not burdening the user with redundant notifications.

For example, the notification delivery service 349 may deliver a notification to an email account of the user 305 based on a preference indicated in the notification information 343. Later, the notification delivery service 349 may detect that the user 305 is online during the lifespan period and may deliver an associated notification to the user 305 using, for example, a pop-up window. If the user 305 first accesses the notification delivered to the email account (e.g., because the user 305 was reading email when the pop-up window was delivered), the user 305 may cause the associated redundant pop-up window notification to be vacated or removed. Alternatively, the user 305 may fail to access either notification during the lifespan period, which causes both notifications to be vacated.

The notification delivery service 349 may deliver notifications in a certain order based on a delivery precedence. The delivery precedence may be related to notification subject matter and/or time sensitivity (e.g., as measured by lifespan). For example, a delivery precedence may define that a notification for a severe weather alert has a higher delivery precedence than a notification of a baseball score. Similarly, the delivery precedence may define that a notification with only thirty minutes of remaining lifespan has a higher precedence than a notification having 36 hours of remaining lifespan.

The network 315 typically allows direct or indirect communication between the delivery mechanism 310 and the online service 320, irrespective of physical or logical separation. Examples of a network 315 include the Internet, the World Wide Web, WANs, LANs, analog or digital wired and wireless telephone networks (e.g., PSTN, ISDN or xDSL), radio, television, cable, satellite, and/or any other delivery mechanism for carrying data. The network 315 may be secured or unsecured.

Each of the delivery mechanism 310, the network 315, and the online service 320 may further include various mechanisms for delivering voice and/or non-voice data, such as, for example, the short message service, the wireless application protocol (WAP), the transport connection protocol (TCP), the Internet protocol (IP), the World Wide Web, one or more local area networks, and/or one or more wide area networks. The delivery mechanism 310, the network 315, and the online service 320 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

One or more other services may be included in the components of notification delivery system 300 and/or these components (hereinafter the system services) may be included as part of one or more other services. For example, the system services may include or be included in a general-purpose or a special-purpose computer (e.g., a personal computer, a PDA, or a device specifically programmed to perform certain tasks), at least one local area network, and/or at least one wide area network. In either case, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
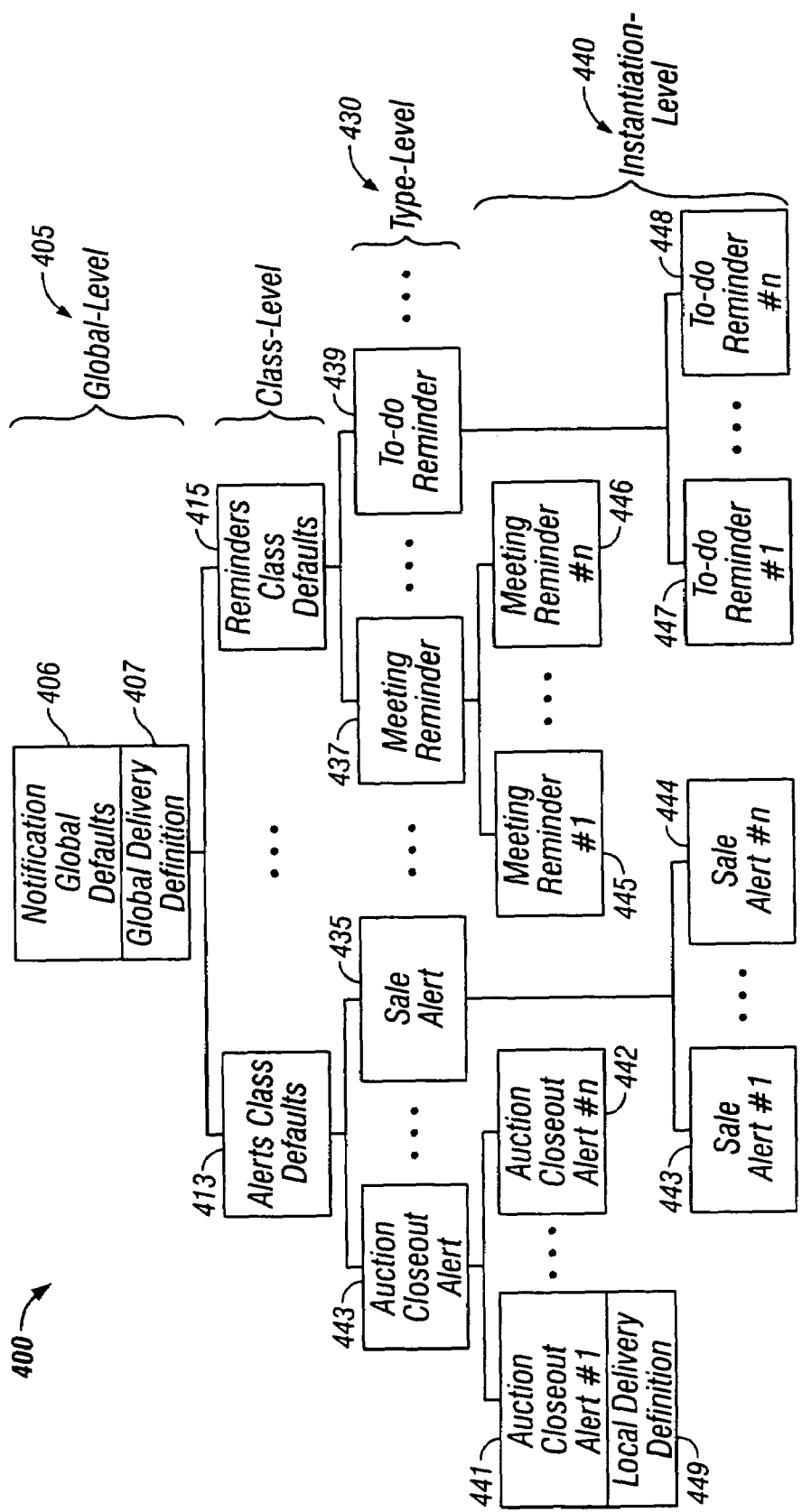
FIGS. 4–6 illustrate an exemplary data structure that may be associated with electronic notifications deliverable by the system of FIG. 3.

FIG. 4. illustrates a notification data structure 400 that may be used by the notification service 320 of FIG. 3 to maintain the notification information 343. The notification data structure 400 is structured as a hierarchical tree and provides a logical representation of the notification information 343. For example, a highest hierarchical level of the notification data structure 400 includes a notification global-level 405 that includes a notification global defaults node 406 representative of a generalized notification.

A lower class-level 410 of the notification data structure 400 further defines notifications according to notification classes. For example, as shown, the notifications may include a class of notifications that are event-based alerts 413, and a class of notifications that are date-based reminders 415. Other notification classes are possible, such as, for example, a class for notifications allowing public membership, a class for notifications with private membership, and a class based on a quality of one or more targeted recipients.

The notification data structure 400 includes a type-level 430 that further defines the notifications according to notification type. The alerts class 413 includes, for example, an auction closeout alert type 433 and a sale alert type 435. Similarly, the reminders class 415 includes a meeting reminder type 437, and a to-do reminder type 439, among others. Still further, the notification data structure 400 includes an instantiation-level 440 to identify and define activated instantiations of the notification type. Each notification type (e.g., the auction closeout alert type 433) may include active instantiations of that notification. For example, the auction closeout alert type 433 may include instantiations of that alert activated by user registration (e.g., auction closeout alert #1 441 through auction closeout alert #n 442). Other instantiations include sale alert #1 443 through sale alert #n 444, meeting reminder #1 445 through meeting reminder #n 446, and to-do reminder #1 447 through to-do reminder #n 448.

Each level of the notification data structure 400 may include both system definition information and user preference information for the notification information 343. For example, the notifications global-level 405 may include system-defined delivery information and user-defined delivery information. To the extent that there is contradiction, the user preference information may preempt the system definition information for a given hierarchical level of the notification data structure 400. Moreover, each node of the notification data structure 400 may be configured to inherit notification information 343 from a node of a higher hierarchical level from which the node depends. Stated differently, notification information 343 may pass from a higher hierarchical level of the notification data structure 400 to a lower level to provide information missing at the lower level.

For example, the notifications global node 406 includes a global delivery definition 407. Since the alerts class lacks its own delivery definition, the alerts class defaults 413 inherit the global delivery definition 407 from the notification global defaults 406. The auction closeout alert type 433 also fails to define a delivery definition, such that the auction closeout alert type 433 inherits the global delivery definition 407 from the alerts class 413. However, auction closeout alert #1 441, an instantiation of the auction closeout alert type 433, includes a local delivery definition 449. To the extent that the local delivery definition 449 is complete, that definition overrides the global delivery definition 406 that it would inherit otherwise. On the other hand, auction closeout alert #n 442, a further instantiation of the auction alert type 433, does not include a delivery definition and inherits the global delivery definition 407 from the auction closeout alert type 433.

Figure 5:
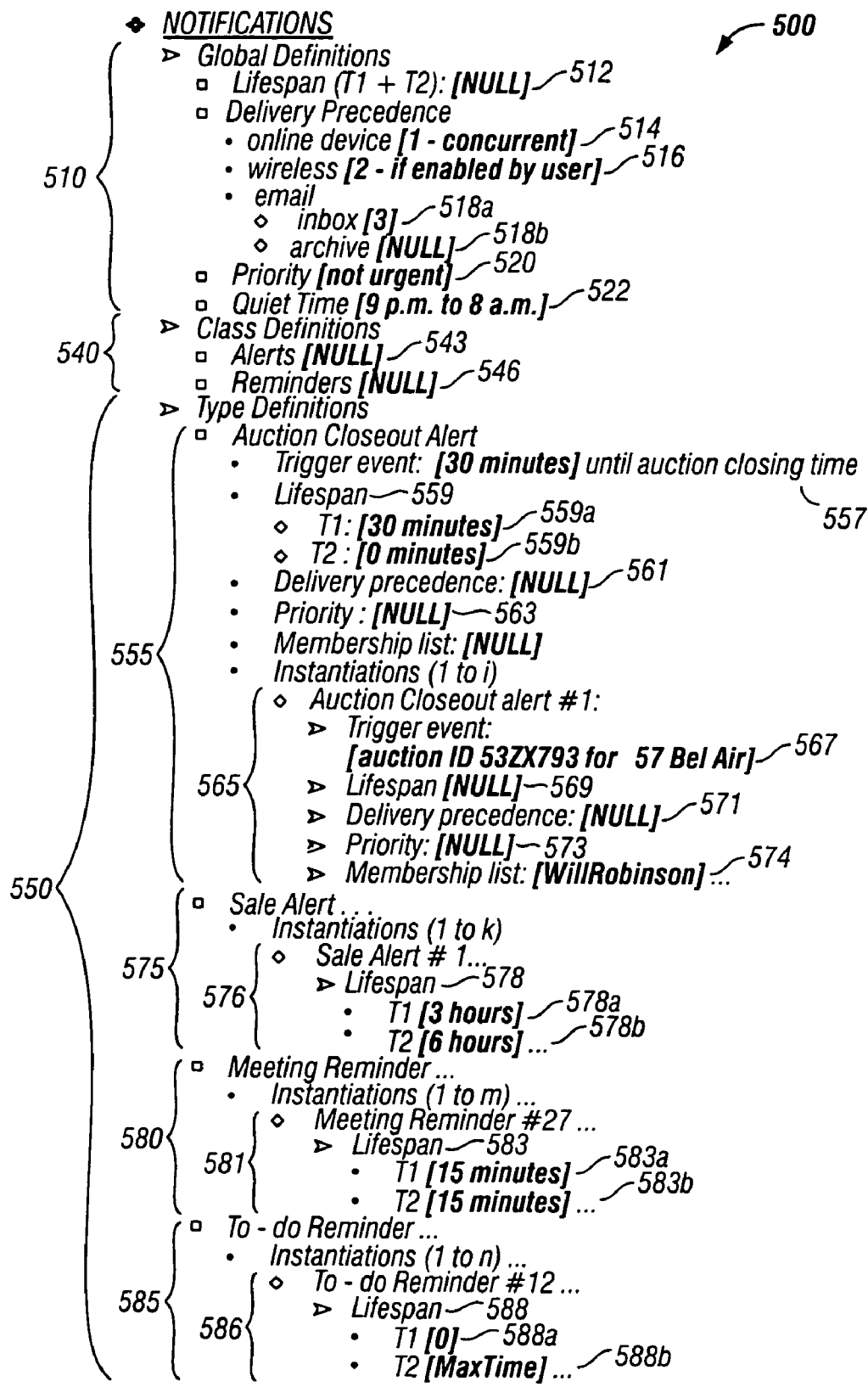
Figure 6:
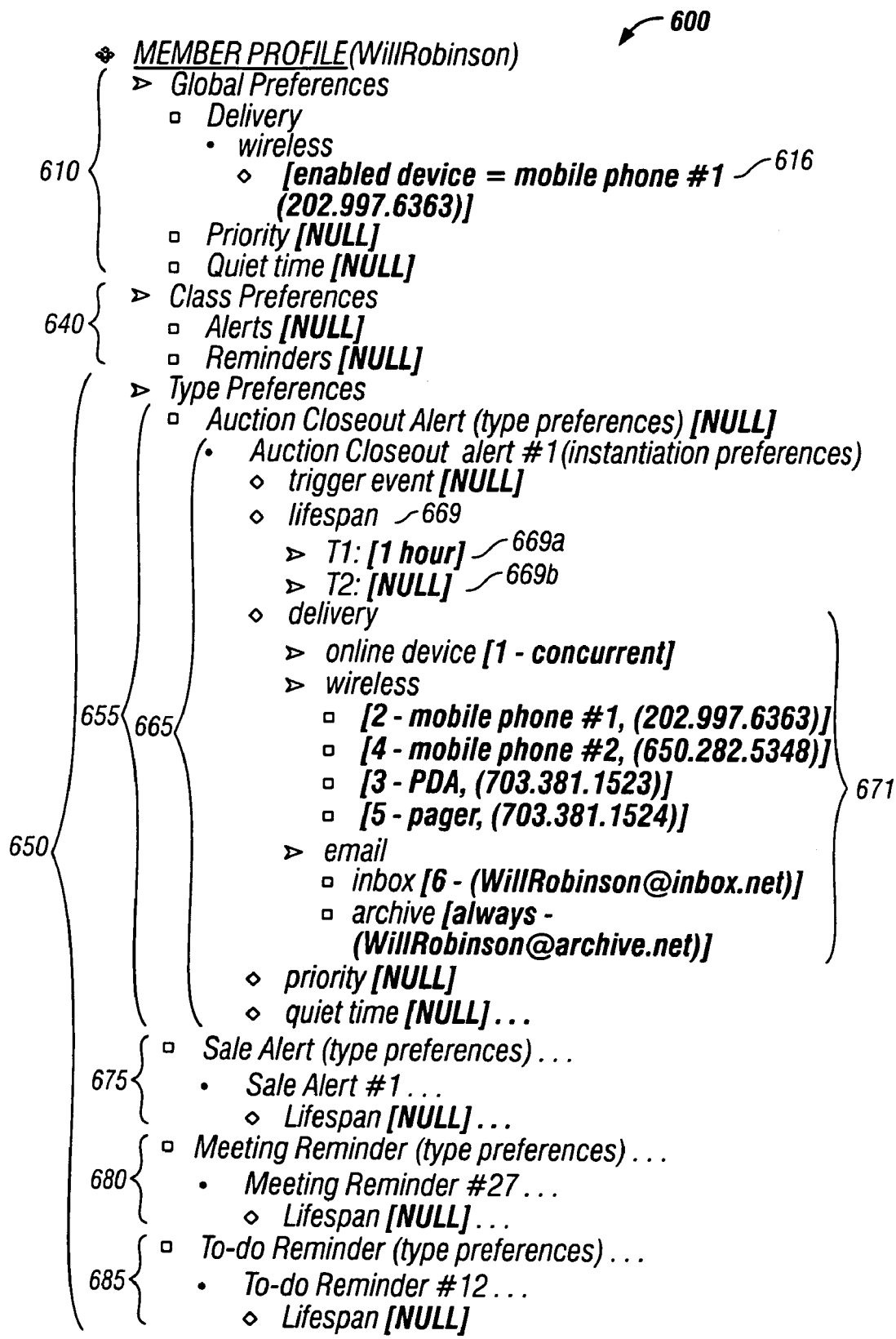

FIGS. 5 and 6 illustrate an implementation of the notification data structure 400 that includes data structures for structuring the system definition information and the user preference information, respectively. The exemplary data structures of FIGS. 5 and 6 are similar and parallel each other.

Referring to FIG. 5, the notification data structure 400 includes system definitions 500. The system definitions 500 include global definitions 510, class definitions 540, and type definitions 550. The global definitions 510, for example, define a form of a global lifespan 512 as including a sum of two time periods, T1 and T2. The time periods T1 and T2 represent a notice period and a response period, respectively. As indicated by the null value, however, the global definitions 510 do not provide a global default lifespan value.

The global definitions 510 also indicate a global delivery precedence that controls whether and/or when the notification delivery service 349 delivers a notification to a particular delivery mechanism. More specifically, the global definitions 510 instruct the notification delivery service 349 to select the following delivery mechanisms as delivery recipients in the order of preference shown: (1) an online device 514, if the user is online, (2) a wireless client 516, if wireless delivery is enabled for the user, and (3) an email inbox 518*a*. Lastly, an email archive 518*b* is provided for, but is not activated as a delivery option in this configuration.

Delivery to the online device 514 is designated as "concurrent." Concurrent delivery indicates that the notification will be delivered online upon detection of an online presence of the user 305, even if the notification already had been delivered to the user 305 offline. The global definitions also define notification priority 520 to be "not urgent," and that a "quiet time" 522 applies between 9:00 PM and 8:00 AM during which only urgent notifications are delivered to attract the immediate attention of the user 305.

The system definitions 500 also include class definitions 540 for an alert class 543 of notifications and for a reminders class 546 of notifications. In this example, neither the alert class 543 nor the reminders class 546 includes any system definition information.

Additionally, the system definitions 500 include type definitions 550 that define, for example, an auction closeout alert type 555, a sale alert type 575, a meeting reminder type 580, and a to-do reminder alert 585. For brevity, only the auction closeout alert type 555 is described in detail as the other alert types are similar in most relevant aspects. The auction closeout alert type 555 defines, for example, a trigger event 557 on which the auction closeout alert type 555 is triggered. In this case, the trigger event 557 occurs upon reaching a time thirty minutes prior to closeout of a specified auction. The auction closeout alert type 555 also defines a thirty minute lifespan 559 in which T1 559*a* is equal to thirty minutes and T2 559*b* is equal to zero minutes. In this case, T1 559*a* is indicative of a notice period between generation of the alert and occurrence of the auction closeout. On the other hand, T2 559*b* represents a response period following the auction closeout during which meaningful participation in the auction may occur. Because no further participation is permitted after the auction closes, the value of T2 559*b* is set to zero minutes. In addition, although it does not do so here, the auction closeout alert type 555 may define an associated delivery precedence 561 and notification priority 563.

One or more active instantiations may be associated with each notification type. The active instantiations may include corresponding system definition information. For example, auction closeout alert #1 565 is one instantiation of the auction closeout alert type 555. Auction closeout alert #1 565 includes information that further defines a trigger event of the alert. More specifically, the trigger event information 567 identifies an associated auction using an auction identification number, 53ZX793, and a subject of the auction, a 1957 Chevrolet Bel Air. The auction closeout alert #1 565 also may define the lifespan 569, the priority 571 of the alert, and the delivery precedence 573, although those definitions are left null valued in this example. Additionally, the auction closeout alert #1 563 defines a membership list 574 of users registered to receive the notification and an identification associated with each user. The identification may include, for example, a name of the user, an identification of the user, a login, a password, and/or a screen name. In the example shown, the user is identified by the screen name Will Robinson. Based on the screen name of the user Will Robinson, the notification service may access stored user preferences of Will Robinson.

Referring briefly to instantiations of other notifications types, a lifespan is defined by each of sale alert #1 576, meeting reminder #27 581, and to-do reminder #12 586. With respect to the sale alert #1 576, the lifespan values T1 578*a* (3 hours) and T2 578*b* (6 hours) may represent a time remaining until the sale begins, and a duration of the sale, respectively. With respect to the meeting reminder #27 581, the lifespan values T1 583*a* (15 minutes) and T2 583*b* (15 minutes) may represent a time remaining until the meeting is scheduled to begin, and a time period after which meeting attendance is judged no longer to be beneficial, respectively. With respect to to-do reminder #12 586, the lifespan value T2 588*b* (Max-Time) may represent that the relevance of the subject of the to-do reminder is not time dependent, and, hence, that the lifespan should be treated as infinite.

Each of these lifespans 578, 583, and 588 is defined at the instantiation level because each instantiation of the sale alert type 575, the meeting reminder type 580, and the to-do reminder type 585 is expected to vary significantly from other instantiations of the same type. For example, sale alerts may vary significantly to reflect the timing and duration of the subject sales. More specifically, subject sales may include a one-hour internet sale as well as a full-week sale at a local department store. Because the associated lifespans are expected to vary accordingly, the lifespans are defined at the instantiation level. The length and timing of a meeting and the timing constraints associated with a to-do task may be expected similarly to vary.

Referring to FIG. 6, the notification data structure 400 also may include a user profile with user preferences 600. Like the system definitions 500, the user preferences 600 include global preferences 610, class preferences 640, and type preferences 650. In the illustration of FIG. 6, all of the global preferences are null valued except for wireless delivery preference 616. That preference indicates that mobile phone #1 is enabled generally to receive notifications for Will Robinson. To enable mobile phone #1 to receive notifications, Will Robinson may identify mobile phone #1 as a preferred delivery mechanism and may identify contact information related to mobile phone #1, such as, for example, an associated phone number (202) 997–6363. Although mobile phone #1 is enabled, no associated delivery precedence is provided.

Class preferences 640 also are provided for both the alerts class 643 and the reminders class 646. Those preferences, however, are null valued in this illustration.

The type preferences 650 may include preferences for various notification types for which Will Robinson has registered, such as, for example, the auction closeout alert type 655, the sale alert type 675, the meeting reminder type 680, and/or the to-do reminder type 685. For brevity, FIG. 6 provides detail only for the auction closeout alert type 655. The auction closeout alert type 655 includes type-level preferences and a single auction closeout alert instantiation (i.e., auction closeout alert #1 665) having associated instantiation preferences. The type preferences for the auction closeout alert type 655 are null valued.

Nevertheless, at the instantiation level, auction closeout alert #1 665 defines the T1 component 669*a* of the lifespan 669 as 1 hour, based, for example, on a desire of the user to receive notification 1 hour before closeout. The auction closeout alert #1 665 also defines the following delivery precedence 671: (1) an online device (if the user is online), (2) a mobile phone #1, (3) a PDA, (4) a mobile phone #2, (5) a pager, and (6) an email inbox. Lastly, an email archive is identified to always receive notification. In addition, the auction closeout alert #1 665 defines the notification priority 673 as "urgent," while leaving "quiet time" 674 undefined as a null value.

Figure 7:
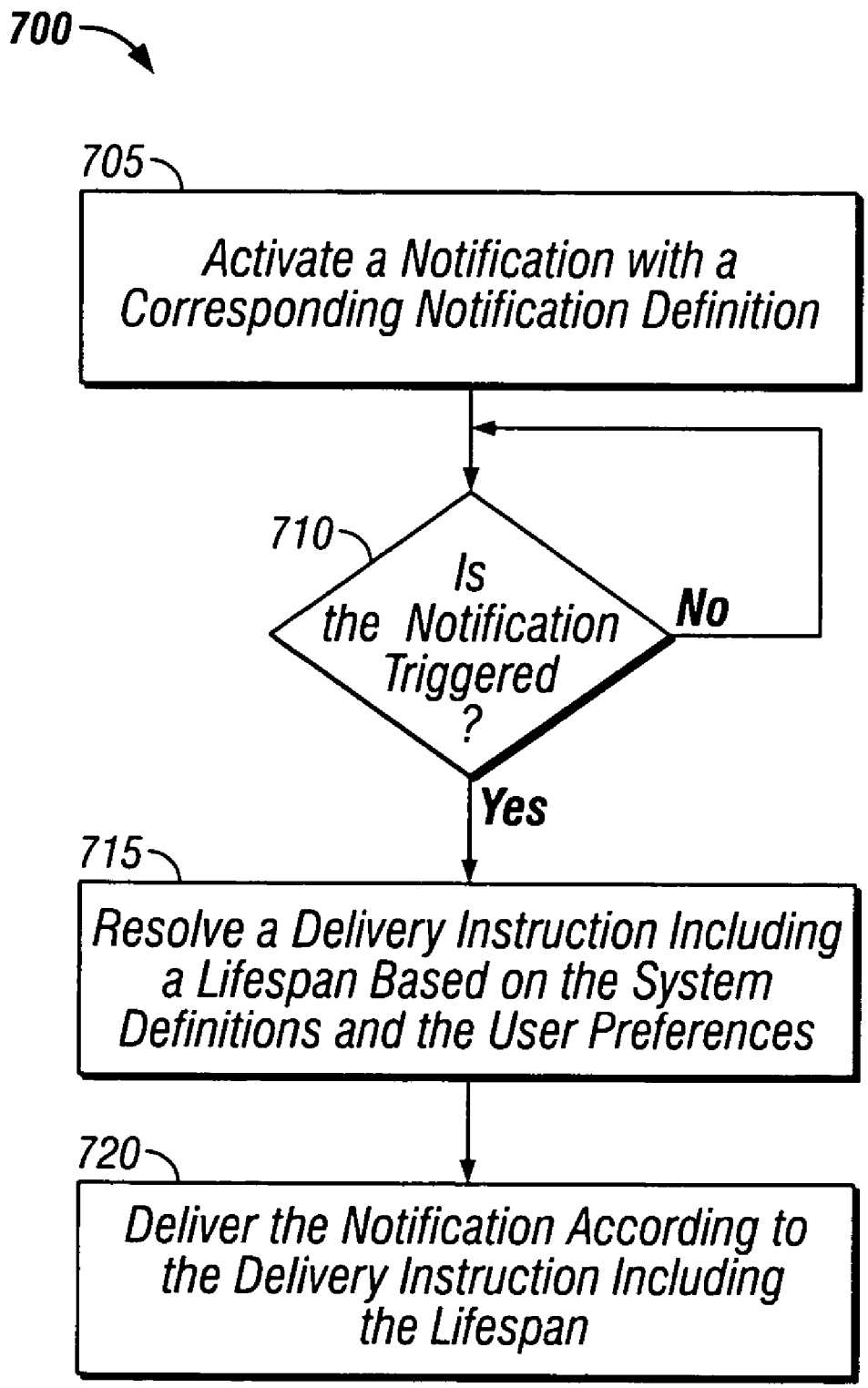
FIGS. 7–9 are flow diagrams illustrating an exemplary process implementable by the notification delivery system of FIG. 3.

FIG. 7 illustrates a flow diagram of a process 700 implementable by, for example, the system of FIG. 3 to deliver a notification to a user based on a lifespan of the notification and other notification information 343. As previously described, the notification information 343 may include system definitions and user preferences associated with the notification. Initially, the user 305 accesses the notification service 340 to activate a notification (step 705). For example, the user 305 may subscribe to an existing notification such as the auction closeout alert described previously. Subscription to the auction closeout alert creates an active instantiation of that alert (e.g., auction closeout alert #1) associated with the user 305.

Based on the notification information 343, including the trigger event for the notification, the notification generation service 346 determines whether information of the information service 330 triggers the notification (step 710). For example, the notification generation service 346 may poll the information service 330 to detect the occurrence or nonoccurrence of the trigger event. As long as the trigger event is not detected, the notification generation service 346 may continue to monitor for occurrence of the trigger event.

The notification generation service 346 also may inform the information service 330 of the trigger event, or the information service 330 itself may determine the trigger event. In either case, the information service 330 may monitor its information for occurrence of the trigger event. When the information service 330 detects that the trigger event has occurred, the information service 330 may notify the notification generation service 346 of that occurrence. For example, the information service 330 may include an online auction service (e.g., eBay®) that may monitor auction activity for a trigger event selected by an auction participant. When that event is detected, the online auction service may inform the notification generation service 346.

After the notification has been triggered (step 710), the notification delivery service 349 resolves a delivery instruction associated with the notification (step 715). The delivery instruction is resolved based on the notification information 343 (e.g., the lifespan), including the system definitions and/or user preferences associated with the notification (step 715).

The notification delivery service 349 delivers the notification based on the previously resolved delivery instruction (step 720). The delivery instruction indicates a lifespan during which the notification may be delivered and/or accessed by the user. The delivery instruction may direct the notification delivery service 349 to monitor for an online presence of the user 305 (e.g., that the user 305 is browsing the web, has an active instant messaging session, is online using a television, is online using a game console, is online using a networked radio, or is active in a chat room discussion) within the lifespan period. If an online presence is detected, the notification delivery service 349 delivers the notification to the user 305 online.

Figure 8:
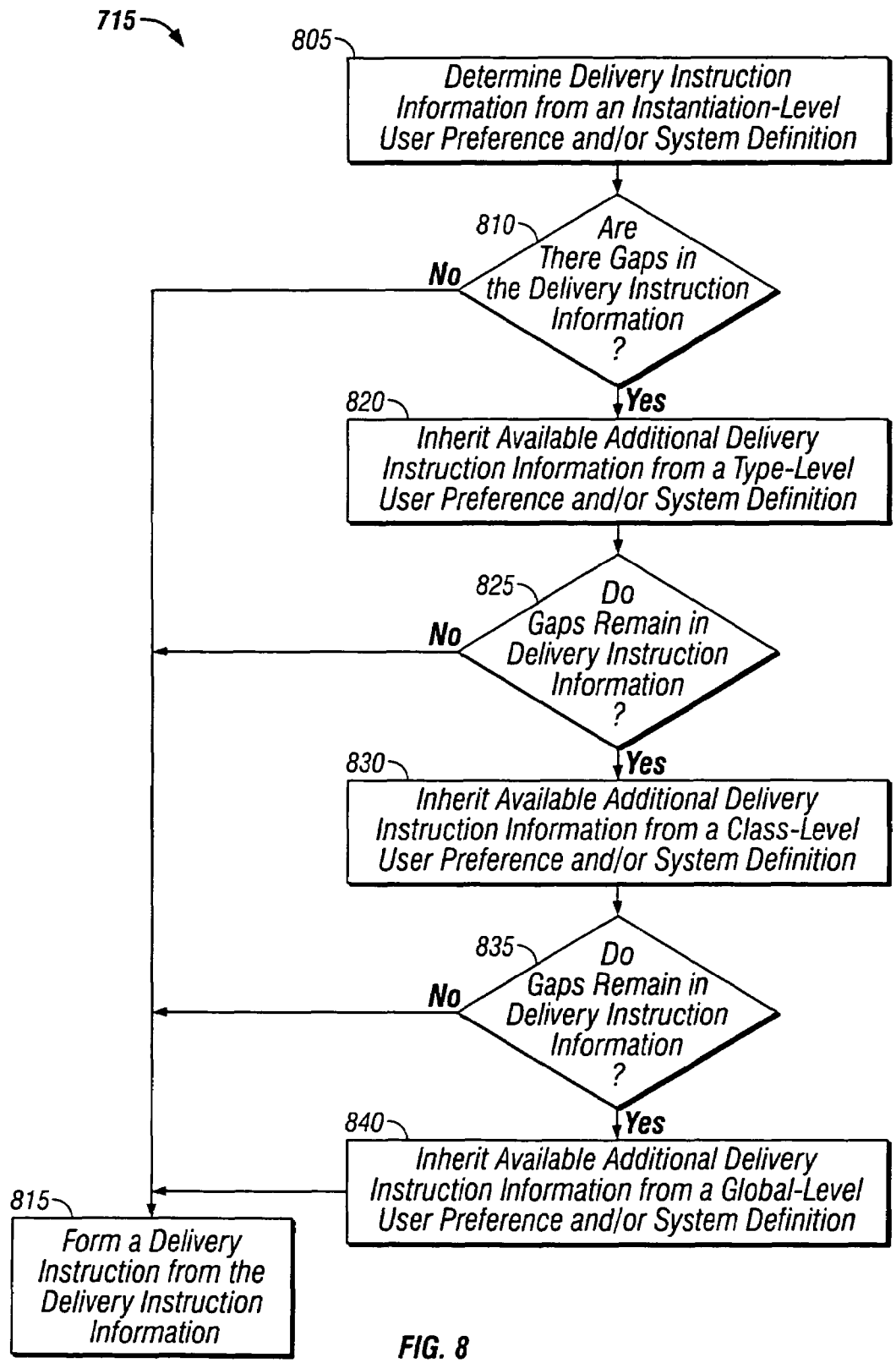

Referring to FIG. 8, a delivery instruction may be resolved (step 715) by determining delivery instruction information from an instantiation-level user preference and/or system definition (step 805). If no gaps are identified in the delivery instruction information (step 810), the delivery instruction is formed based on the delivery instruction information (step 815). Otherwise, if gaps are identified (step 810), additional delivery instruction information is inherited from a type-level user preference and/or system definition (step 820). The supplemented delivery instruction information is evaluated for completeness again (step 825). If the supplemented delivery instruction information is complete, the notification delivery service 349 forms the delivery instruction based on that information (step 815). Otherwise, if gaps remain in the delivery instruction information, that information inherits additional delivery instruction information from a class-level user preference and/or system definition (step 830), and the process of evaluating the completeness of the supplemented delivery instruction information is repeated (step 835). As before, the notification delivery service 349 forms a delivery instruction from the supplemented delivery information where that information is complete (step 815). Otherwise, the notification delivery service 349 forms the delivery instruction (step 815) after the delivery instruction information is further supplemented through inheritance based on a global-level user preference and/or system definition (step 840).

The process of FIG. 8 may be used to resolve a delivery instruction for auction closeout alert #1 described with respect to the system definitions 500 and the user preferences 600 of FIGS. 5 and 6, respectively. Initially, delivery instruction information is determined from the instantiation-level user preferences 660 of auction closeout alert #1 (step 805). That information defines the T1 value of the lifespan as 1 hour, but leaves the T2 value undefined. Although undefined by the user preferences 660, the trigger event is defined partly by the instantiation-level system definitions 563 that provide the auction ID and that identify the subject of the auction.

The instantiation-level user preferences 660 define a delivery precedence 663 as described previously: (1) an online device (concurrently, if the user is online), (2) a mobile phone #1, (3) a PDA, (4) a mobile phone #2, (5) a pager, and (6) an email inbox. In addition, an email archive is identified to always receive notification. The user preference information 660 of auction closeout alert #1 also defines a notification priority 666 as "urgent," but leaves "quiet time" 669 undefined.

The delivery instruction information provided above fails to define fully the trigger event. The delivery instruction information also fails to define the T2 value of the lifespan or the "quiet time" 669. Moreover, the detailed delivery precedence 663 described above is open-ended. That delivery precedence 663 would not be contradicted by adding, for example, an additional delivery mechanism to assume a seventh place role in the delivery precedence. In sum, gaps exist in the delivery instruction information (step 810).

The gaps in the delivery instruction information are filled partially by information of the type-level system definitions 563 (step 820). More particularly, the type-level system definitions 550 further define the trigger event as occurring 30 minutes prior to closing time of the auction. The type-level system definitions 550 also define as zero the value of T2 of the lifespan. These additional and consistent pieces of information are inherited by the delivery instruction information, while contradictory information (e.g., the definition of T1 of the lifespan as 30 minutes) is not. Despite the inherited information, gaps remain in the delivery instruction information. For example, "quiet time" remains undefined and addition to the delivery precedence definition is not foreclosed (step 825).

The remaining gaps in the delivery instruction information are not filled by any information of the class-level system definitions 540 or user preferences 640 (steps 830–835). Likewise, the global-level user preferences 610 do not provide a "quiet time" definition. The global-level user preferences 610 do include some delivery information 616. That information, however, is not additional to delivery precedence information already determined. More specifically, that information simply notes that mobile phone #1 is enabled to receive a wireless notification, information already included in the instantiation-level preference information 663 that also provides that mobile phone #1 ranks number three in the delivery precedence.

However, the global-level system definitions 510 define "quiet time" 524 as between 9:00 PM and 8:00 AM, information additional to that already obtained. This additional delivery instruction information is inherited to fill the prior information gap (step 840). Note also that the global-level system definitions 510 provide delivery precedence information 512–520 and priority information 522 that is inconsistent with the aggregated delivery instruction information and, therefore, is not inherited.

Having determined the relevant delivery instruction information, the notification delivery service 349 then forms a delivery instruction based on that information (step 815). The delivery instruction may be formed, for example, by converting the relevant delivery instruction information into a format or protocol required for delivery. The delivery instruction may remain substantively similar to the relevant delivery instruction information. In this example, the delivery instruction provides that the notification is "urgent," that a "quiet time" from between 9:00 PM and 8:00 AM applies, and that the notification should be delivered within a one hour lifespan according to the following delivery precedence: attempt delivery first to an online device (if the user is online); second, to a mobile phone #1; third, to a PDA; fourth, to a mobile phone #2; fifth, to a pager; and sixth, to an email inbox. Because concurrent delivery to the online device is indicated, the notification will be delivered online upon detection of an online presence of Will Robinson, even if the notification already had been delivered to Will Robinson offline. Lastly, the notification is to be delivered to an email archive, irrespective of the lifespan.

Figure 9:
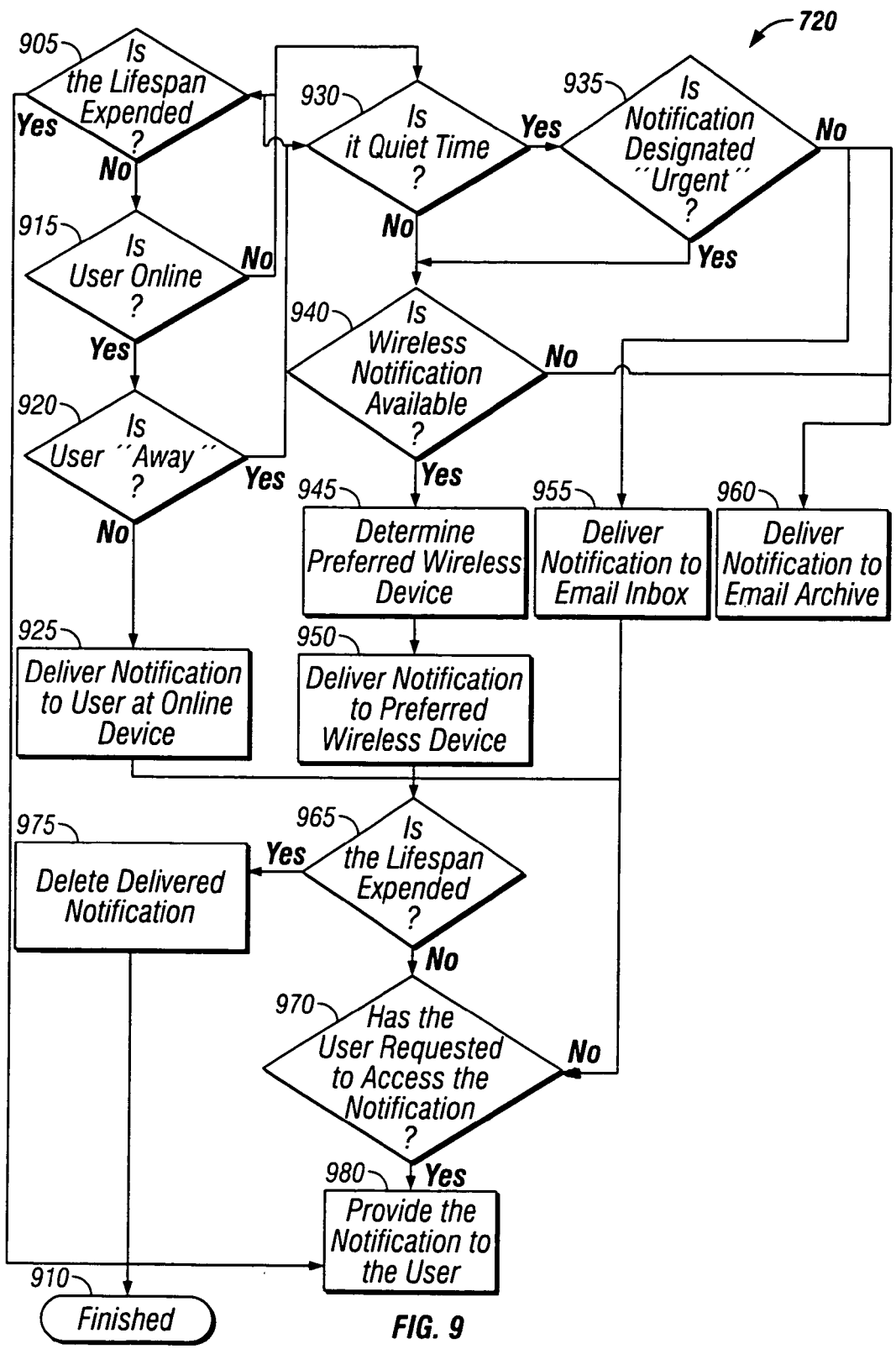

Referring to FIG. 9, delivering the notification according to the delivery instruction may include determining whether the lifespan of the notification has been expended (step 905). If the lifespan is expended, the notification delivery service does not deliver the notification and the process is finished (step 910).

If the lifespan is not expended (step 905), then the notification delivery service determines whether the user 305 is online (step 915). If the user 305 is online, the notification delivery service 349 determines further whether the user 305 is away temporarily (e.g., although having an established online session using an online delivery mechanism, the user 305 has marked himself as "away," or the user 305 has engaged in no activity using the online delivery mechanism for a predetermined period of time) (step 920). If the notification delivery service 349 determines that the user 305 is online and is not away from the online delivery mechanism, the notification delivery service 349 delivers the notification to that online delivery mechanism (step 925).

If the notification delivery service 349 determines, however, that the user 305 is not online (step 915), or is away from the online delivery mechanism (step 920), then the notification delivery service 349 determines again if the lifespan is expended (step 905) and continues to monitor for an online presence of the user 305 (steps 915 and 920).

Concurrently with online delivery, the notification delivery service determine whether it presently is "quiet time" for the user 305 (step 930). The notification delivery service 349 also determines whether the notification is designated as "urgent" (e.g., a notification might be marked "urgent" when the notification provides an alert that a tornado has been spotted near the user's home address) (step 935). Where the notification delivery service 349 determines that it is not "quiet time" or that the notification is "urgent" (i.e., "urgency" overrides "quiet time"), the notification delivery service 349 determines whether wireless notification is available for the user 305 (e.g., through notification to a mobile phone, a PDA, a pager) (step 940). If wireless notification is available, the notification delivery service 349 determines a wireless delivery mechanism at which the user 305 prefers to receive the notification (step 945) and delivers the notification to that wireless delivery mechanism (step 950).

However, should the notification delivery service 349 determine that it is "quiet time" (step 930) and that the notification is not "urgent" (step 935), or that wireless notification is unavailable (step 940), the notification delivery service 349 delivers the notification to an email inbox (step 955). Irrespective of delivery or lack of delivery to other delivery mechanisms, the notification delivery service 349 also delivers the notification to an email archive (step 960).

Whether the notification is delivered online, to a wireless device, or to an email inbox, the notification delivery service 349 may monitor whether the lifespan of the notification becomes expended before the notification is accessed by the user 305 (steps 965 and 970). If the lifespan of the notification becomes expended before the user accesses the notification, the notification may be vacated (e.g., the notification may be deleted from a notification delivery mechanism to which the notification was delivered) (step 975) and the delivery process may be concluded (step 910). Otherwise, if the notification is accessed by the user before the notification lifespan becomes expended, the notification delivery service may provide the notification to the user (step 980), and the delivery process may be concluded (step 910).

Alternatively, or in addition, after the user accesses the delivered notification (step 970), the notification delivery service 349 may cause to be vacated redundant instances of the same notification that were delivered to other delivery mechanisms. For example, those redundant instances of the notification might be vacated as the lifespan period becomes expended. In another implementation, accessing of the notification by the user 305 may trigger the notification delivery service to cause the redundant instances of the notification to be vacated. For example, access by the user of an online notification may cause the notification delivery service to transmit a secured (e.g., authenticated and encrypted) recall message to an email inbox to which a now redundant notification was delivered. The secured recall message may act to remove the redundant notification from the inbox before the redundant notification becomes a source of inconvenience to the user.

Figure 10:
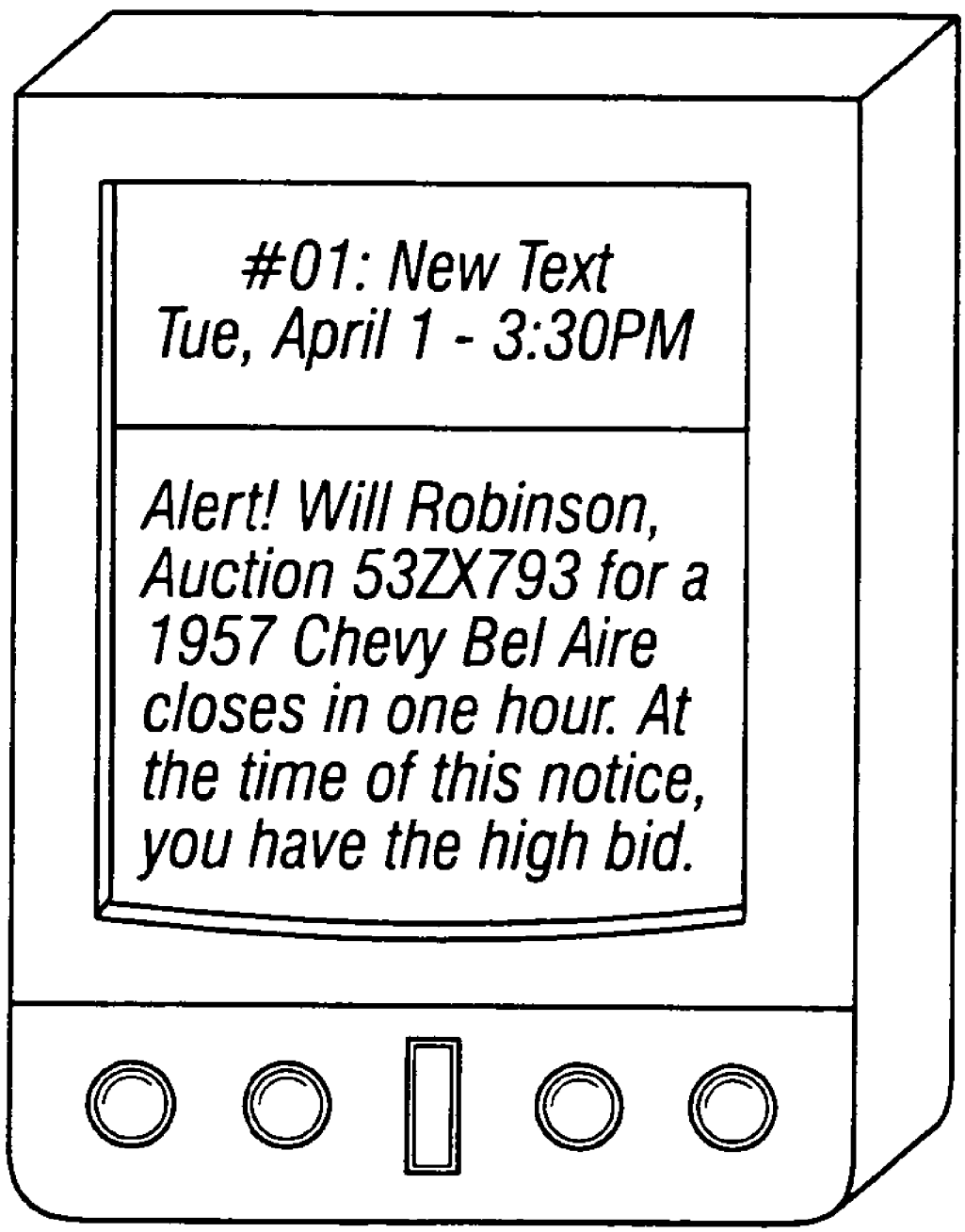
FIG. 10 illustrates an exemplary notification delivered to a user at a mobile device.

FIG. 10 illustrates an auction closeout alert that may be delivered to a PDA or mobile phone of a user. The auction closeout alert may be any type of instant message, pop-up window, icon, and or audible or tactile alarm capable of gaining the attention of the user. The auction closeout alert may provide information such as an alert identifier, identification of the auction item, a bid status at time of notification, and a date and time stamp of when the auction closeout alert was generated. The PDA or mobile phone also notifies the user "Alert! Will Robinson. Auction 53ZX793 for a 1957 Chevy Bel Aire closes in one hour. At the time of this notice, you have the high bid." In another aspect, the auction closeout alert may include an edit button for editing the presentation of the alert, and a respond/more information button for accessing the auction using the online service to update a bid and/or to obtain more detailed information regarding the auction.

Other implementations are within the scope of the following claims.

What is claimed is:

1. A notification system that provides an electronic notification to an intended recipient, the notification system comprising an online service provider system including at least one processing device and including:
    a notification service configured to enable an originator of an electronic notification to input attribute information for the electronic notification that includes:
        future time information accessible as a basis for determining a future time for making a plurality of electronic messages that each include the electronic notification accessible to the intended recipient, the plurality of electronic messages including a particular electronic message and at least one other electronic message, and
        expiration time information accessible as a basis for determining an expiration time subsequent to the future time for making the plurality of electronic messages inaccessible to the intended recipient; and
    a notification delivery service configured to:
    determine the future time based on the future time information,
    determine the expiration time based on tile expiration time information,
    make a plurality of electronic messages accessible to the intended recipient subsequent to the future time but prior to the expiration time,
    determine whether the intended recipient accesses the accessible particular electronic message prior to the expiration time, and
    remove accessibility by the intended recipient to the at least one other electronic message while concurrently maintaining accessibility by the intended recipient to the particular electronic message conditioned on determining that the intended recipient has accessed the particular electronic message prior to the expiration time.

2. The system of claim 1, wherein the notification delivery service being configured to remove accessibility by the intended recipient to the at least one other electronic message while concurrently maintaining accessibility by the intended recipient to the particular electronic message comprises the notification delivery service being configured to:
    conditioned on determining that the intended recipient has accessed the accessible particular electronic message prior to the expiration time, perform a process to vacate the at least one other electronic message such that the at least one other electronic message is no longer accessible to the intended recipient and not perform the process to vacate the particular electronic message such that the particular electronic message remains accessible to the intended recipient.

3. The system of claim 1, wherein the notification delivery service is configured to remove accessibility by the intended recipient to the at least one other electronic message while concurrently maintaining accessibility by the intended recipient to the particular electronic message at the expiration time conditioned on determining that the intended recipient has accessed the accessible particular electronic message prior to the expiration time.

4. The system of claim 1, wherein the notification delivery service is configured to remove accessibility by the intended recipient to the at least one other electronic message while concurrently maintaining accessibility by the intended recipient to the particular electronic message in response to the intended recipient accessing the particular electronic message prior to the expiration time.

5. The system of claim 1, wherein the notification delivery service is configured to remove accessibility by the intended recipient to the at least one other electronic message while concurrently maintaining accessibility by the intended recipient to the particular electronic message upon the intended recipient accessing the particular electronic message prior to the expiration time.

6. The system of claim 1, wherein the notification delivery service is further configured to perform a process to vacate the plurality of electronic messages, including the particular electronic message and the at least one other electronic message, conditioned on determining that the intended recipient has not accessed the accessible particular electronic message prior to the expiration time.

7. The system of claim 1, wherein the electronic notification comprises a reminder and the particular electronic message includes a first instance of the reminder and each of the at least one other electronic messages includes another instance of the same reminder.

8. The system of claim 7, wherein the reminder comprises a birthday reminder.

9. The system of claim 7, wherein the reminder comprises a date-based reminder.

10. The system of claim 7, wherein the reminder comprises a meeting reminder.

11. The system of claim 7, wherein the reminder comprises a to-do reminder.

12. The system of claim 1, wherein the electronic notification comprises an alert and the particular electronic message includes a first instance of the alert and each of the at least one other electronic messages includes another instance of the same alert.

13. The system of claim 12, wherein the alert comprises a stock alert.

14. The system of claim 12, wherein the alert comprises an auction alert.

15. The system of claim 12, wherein the alert comprises a sale alert.

16. The system of claim 12, wherein the alert comprises a weather alert.

17. A notification system that provides electronic notifications to an intended recipient, the notification system comprising an online service provider system including at least one processing device and including:

a notification service configured to enable an originator of a particular electronic notification to input attribute information for the particular electronic notification that includes future time information accessible as a basis for determining a future time for making a plurality of electronic messages that each include an instance of the particular electronic notification accessible to the intended recipient, the plurality of electronic messages including a first electronic message that includes a first instance of the particular electronic notification and a second electronic message that includes a second instance of the particular electronic notification, and a notification delivery service configured to:

determine the future time based on the future time information, make the plurality of electronic messages accessible to the intended recipient subsequent to the future time, determine whether the intended recipient accesses the accessible first electronic message subsequent to the future time, and remove accessibility by the intended recipient to the second electronic message while concurrently maintaining accessibility by the intended recipient to the first electronic message conditioned on determining that the intended recipient has accessed the first electronic message subsequent to the future time.

18. The system of claim 17, wherein the notification delivery service is configured maintain the accessibility by the intended recipient to the first electronic message while concurrently removing the accessibility by the intended recipient to all of the other electronic messages in the plurality of electronic messages conditioned on determining that the intended recipient has accessed the first electronic message subsequent to the future time.

19. The system of claim 17, wherein the particular electronic notification comprises a reminder and the first electronic message includes a first instance of the reminder and the second electronic message includes a second instance of the same reminder.

20. The system of claim 19, wherein the reminder comprises at least one of a birthday reminder, a date-based reminder, a to-do reminder, and a meeting reminder.

21. The system of claim 17, wherein the particular electronic notification comprises an alert and the first electronic message includes a first instance of the alert and the second electronic messages includes a second instance of the same alert.

22. The system of claim 21, wherein the alert comprises at least one of a stock alert, a weather alert, an event-based alert, an auction alert, and a sale alert.

* * * * *